United States Patent
Liu et al.

(10) Patent No.: US 12,372,391 B2
(45) Date of Patent: Jul. 29, 2025

(54) FLOW CONDITIONER FOR SEVERE FLOW DISTURBANCES

(71) Applicant: Honeywell International Inc., Charlotte, NC (US)

(72) Inventors: Rui Liu, Shanghai (CN); Wen Peng, Shanghai (CN); Dong Luo, Shanghai (CN); Li Yang, Shanghai (CN)

(73) Assignee: Honeywell International Inc., Charlotte, NC (US)

( * ) Notice: Subject to any disclaimer, the term of this patent is extended or adjusted under 35 U.S.C. 154(b) by 548 days.

(21) Appl. No.: 17/830,627

(22) Filed: Jun. 2, 2022

(65) Prior Publication Data

US 2023/0071388 A1 Mar. 9, 2023

(51) Int. Cl.
*G01F 15/00* (2006.01)
*F15D 1/00* (2006.01)
*F15D 1/02* (2006.01)
*G01F 1/66* (2022.01)
*G01F 15/10* (2006.01)
*F01N 1/08* (2006.01)

(52) U.S. Cl.
CPC ............ *G01F 15/00* (2013.01); *F15D 1/001* (2013.01); *F15D 1/025* (2013.01); *G01F 1/662* (2013.01); *G01F 15/105* (2013.01); *F01N 1/089* (2013.01)

(58) Field of Classification Search
CPC .. B01F 25/4312; B01F 25/4313; F01N 1/089; F15D 1/0005; F15D 1/001; F15D 1/0025; F15D 1/025; F16L 55/027; F16L 55/02709; F16L 55/02718; F16L 55/02745; F16L 55/02754; F16L 55/02763

USPC ........................................................... 138/41
See application file for complete search history.

(56) References Cited

U.S. PATENT DOCUMENTS

| | | | | |
|---|---|---|---|---|
| 3,964,519 A | * | 6/1976 | De Baun | F15D 1/02 138/41 |
| 4,142,413 A | * | 3/1979 | Bellinga | F15D 1/04 73/198 |
| 4,280,360 A | * | 7/1981 | Kobayashi | G01F 1/64 138/40 |

(Continued)

FOREIGN PATENT DOCUMENTS

| | | | | |
|---|---|---|---|---|
| CN | 105784031 A | * | 7/2016 | G01F 1/662 |
| CN | 107167194 A | * | 9/2017 | G01F 1/662 |

(Continued)

OTHER PUBLICATIONS

Chinese Patent Application No. CN202122119562.6U, filed Sep. 3, 2021; published as Chinese Publication No. CN216081636U.

(Continued)

*Primary Examiner* — Kenneth Rinehart
*Assistant Examiner* — Richard K. Durden
(74) *Attorney, Agent, or Firm* — Ortiz & Lopez PLLC; Luis M. Ortiz; Kermit D. Lopez

(57) ABSTRACT

A flow conditioner includes a group of flow conditioning units including a first flow conditioning unit and a second flow conditioning unit. The flow conditioner also includes a mixing space for developing a flow. The mixing space is located between the first and second flow conditioning units. One of the first or second flow conditioning units can include one or more of a shaper or a reducer, and the other of the first or second flow conditioning units can include one or more shapers.

14 Claims, 3 Drawing Sheets

(56) References Cited

U.S. PATENT DOCUMENTS

| | | | | |
|---|---|---|---|---|
| 5,123,502 | A | * | 6/1992 | Flugger ..................... F01N 3/00 |
| | | | | 181/269 |
| 5,363,699 | A | * | 11/1994 | McCall ................. G01F 15/022 |
| | | | | 138/40 |
| 5,529,093 | A | | 6/1996 | Gallagher et al. |
| 5,588,635 | A | * | 12/1996 | Hartman ................. F16K 47/08 |
| | | | | 138/44 |
| 8,550,208 | B1 | * | 10/2013 | Potokar ..................... F02C 6/08 |
| | | | | 60/785 |
| 2003/0131667 | A1 | | 7/2003 | Gallagher |
| 2012/0297870 | A1 | * | 11/2012 | de Boer ................. F15D 1/025 |
| | | | | 73/272 R |
| 2016/0238046 | A1 | * | 8/2016 | Reiss ..................... F15D 1/025 |
| 2017/0009788 | A1 | | 1/2017 | Sawchuk |
| 2017/0074698 | A1 | * | 3/2017 | Teufel ..................... G01F 1/662 |
| 2019/0186967 | A1 | * | 6/2019 | Priyadarshana ........ G01F 1/662 |
| 2019/0219077 | A1 | * | 7/2019 | Zuffa ..................... F15D 1/025 |

FOREIGN PATENT DOCUMENTS

| | | | | |
|---|---|---|---|---|
| CN | 110906095 | A | * | 3/2020 |
| CN | 111397678 | A | | 7/2020 |
| CN | 215524725 | U | | 1/2022 |
| CN | 215524726 | U | | 1/2022 |
| CN | 216081636 | U | | 3/2022 |
| DE | 4034928 | A1 | * | 5/1992 |
| GB | 2039613 | A | * | 8/1980 ........ F04B 39/0061 |

OTHER PUBLICATIONS

European search Report for corresponding EP Application No. 22191874.1; Jan. 24, 2023.

* cited by examiner

120

1D 1-Double Hive structure Performance

130

3D 2-Double Hive structure Performance

FLOW CONDITIONER FOR SEVERE FLOW DISTURBANCES

CROSS-REFERENCE TO RELATED APPLICATION

This patent application claims priority to Chinese Patent Application No. 202122119562.6, entitled "Rectifier and Flowmeter," which was filed on Sep. 3, 2021, the entire content of which is incorporated herein by reference. Chinese Patent Application No. 202122119562.6 published as Patent Application Publication No. CN216081636U on Mar. 18, 2022.

TECHNICAL FIELD

Embodiments are generally related to the field of fluid measurement. Embodiments further relate to the field of ultrasonic gas flow metering (UGFM), and ultrasonic gas flow meters. Embodiments also relate to flow conditioners configured for severe disturbance flow measurement performance.

BACKGROUND

Flowmeters are utilized widely in various fields. Ultrasonic gas flowmeters, for example, can realize non-contact measurement, with the advantages of high measurement precision, wide measurement range, convenient installation and maintenance, environmental protection, and energy conservation and the like. Ultrasonic gas flowmeters are often used in flow measurement and can be conveniently connected to a current gas composition and employed for diagnostic intelligent metering, thereby meeting expected application prospects. Current ultrasonic gas low meters are sensitive to flow fields and may require the use of a long upstream straight tube to develop the flow into a symmetrical flow field curve. In addition, similar requirements may exist for other flow meters such as turbine flow meters and the like.

The field of ultrasonic gas flow metering (UGFM) can extend applications downstream due to its advantages of meters having no moving parts, nearly free maintenance, and a wide measuring range of various flow rates and turn-down ratio with respect mechanical meters, less loss of thru meter pressure, and easy linkage to future smart metering of gas composition and diagnostics.

Traditional ultrasonic gas flow meters are much sensitive, however, to flow disturbances compared to traditional mechanical meters. Thus, a long upstream straight pipe may be needed to make it possible for the flow to develop to a symmetrical flow profile, which is ideal for ultrasonic flow measurement.

The present inventors believe that a solution to the aforementioned problems lies in the design and implementation of a unique flow conditioner that can provide sufficient flow for ultrasonic measurements while also reducing the need for a very long upstream strait pipe for an ultrasonic flow meter used in severe disturbance flow conditions, such as a halfmoon condition, etc. Along these same lines, the present inventors believe that a solution to the above problems involves the implementation of an ultrasonic flow meter, which can be used in a wider variety of applications, including those with limited installation space and severe disturbance flow.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the embodiments to provide for an improved flow conditioner.

It is another aspect of the embodiments to provide for an improved flow conditioner for user with a flowmeter.

It is a further aspect of the embodiments to provide for a flow conditioner having an integrated sub-assembly of shapers with a reducer located between the shapers.

It is also an aspect of the embodiments to provide for a flow conditioner having a reducer structure that includes a reduced diameter pipe with an inner diameter that gradually decreases along a direction of flow.

It is an additional aspect of the embodiments to provide for a flow conditioner in which fluid produces a retraction effect that further mixes fluid and facilitates asymmetric high-speed flow and low-speed flow in the fluid mix evenly.

The aforementioned aspects and other objectives can now be achieved as described herein. In an embodiment, a flow conditioner, can include a first flow conditioning unit, a mixing space for developing a flow, and a second flow conditioning unit, wherein one of the first or second flow conditioning units can include at least one of a shaper or a reducer, and wherein the other of the first or second flow conditioning units can include at least one shaper.

In an embodiment, each of the first and second flow conditioning units can include at least one reducer.

In an embodiment, the flow conditioner can include a holding part that holds the first and second flow conditioning units and can provide the mixing space for developing the flow.

In an embodiment, the first flow conditioning unit can include two shapers with a reducer located therebetween, wherein the two shapers are associated with the first flow conditioning unit; and the second flow conditioning unit can include two shapers including a first shaper and a second shaper, with a reducer located between the first shaper and the second shaper associated with the second flow conditioning unit.

In an embodiment, the holding part can include process connection to a pipeline.

In an embodiment, the flow conditioner can further include a holding pipe with the mixing space for developing the flow, and a second process connection to a flowmeter.

In an embodiment, the shapers can be configured in a form of, for example, a honeycomb plate, a ring plate, a grid plate, or a capillary tube.

In an embodiment, the shapers can each possess a cross section that is circular or polygonal.

In an embodiment, the reduce can have a reducer structure that includes a reduced diameter pipe with an inner diameter that decreases along the direction of the flow.

In an embodiment, a flowmeter can include a flow conditioner that includes a plurality of flow conditioning units and a mixing space for developing a flow. At least one of the plurality of conditioning units can include one or more of: a shaper and a reducer. At least one of the other flow conditioning units among the plurality of flow conditioning units can comprise at least one shaper.

In an embodiment of the flowmeter, the flow conditioner can include a holding part that holds the plurality of flow conditioning units and provides the mixing space for developing the flow.

In an embodiment, a flowmeter can include a flow conditioner comprising a first flow conditioning unit and a second flow conditioning unit, the flow conditioner further including a mixing space for developing a flow, the mixing space located between the first and second flow conditioning units, wherein one of the first or second flow conditioning units can comprise at least one of a shaper or a reducer, and wherein the other of the first or second flow conditioning units can comprise at least one shaper.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

Like reference symbols or reference numerals in the various drawings indicate like elements.

DETAILED DESCRIPTION

Figure 1:
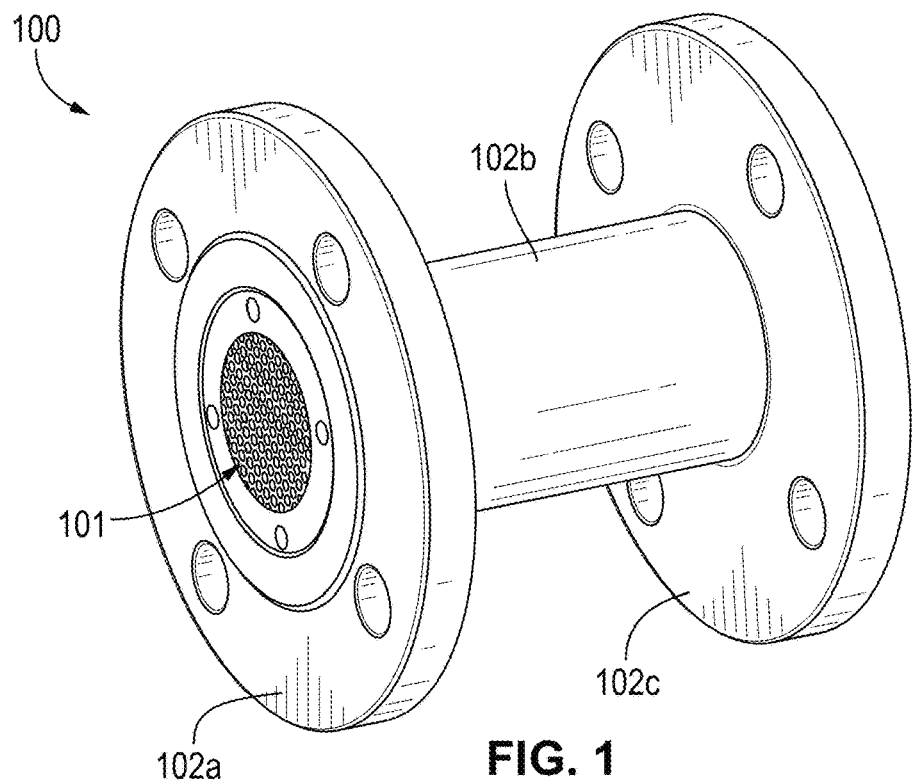
FIG. 1 illustrates a side perspective view of a flow conditioner, which can be implemented in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in an embodiment" or "in one embodiment" or "in an example embodiment" and variations thereof as utilized herein may or may not necessarily refer to the same embodiment. Similarly, the phrase "in another embodiment" or "in another example embodiment" and variations thereof as utilized herein may or may not necessarily refer to a different embodiment. It is intended, for example, that claimed subject matter may include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. The term "at least one" may refer to "one or more". For example, "at least one widget" may refer to "one or more widgets."

Figure 2:
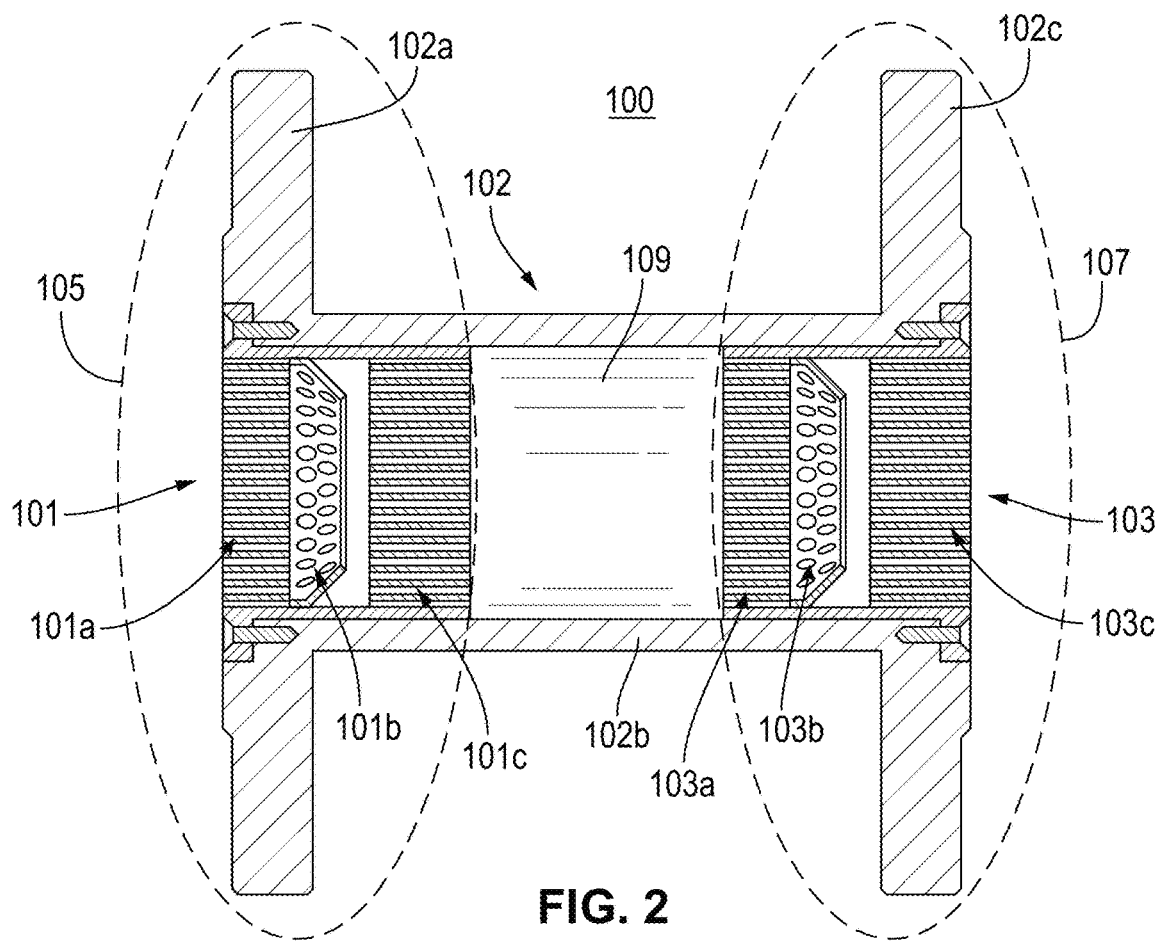
FIG. 2 illustrates side view of the flow conditioner depicted in FIG. 1, in accordance with an embodiment.
Figure 3:
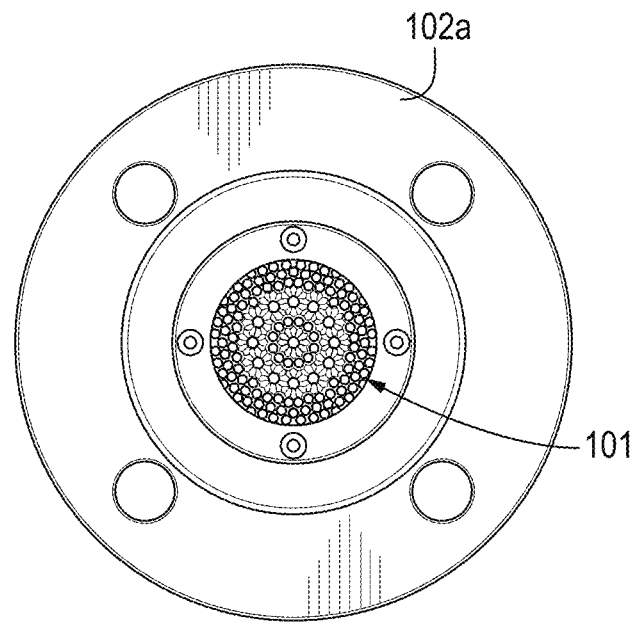
FIG. 3 illustrates a front view of the flow conditioner depicted in FIG. 1 and FIG. 2, in accordance with an embodiment.
Figure 4:
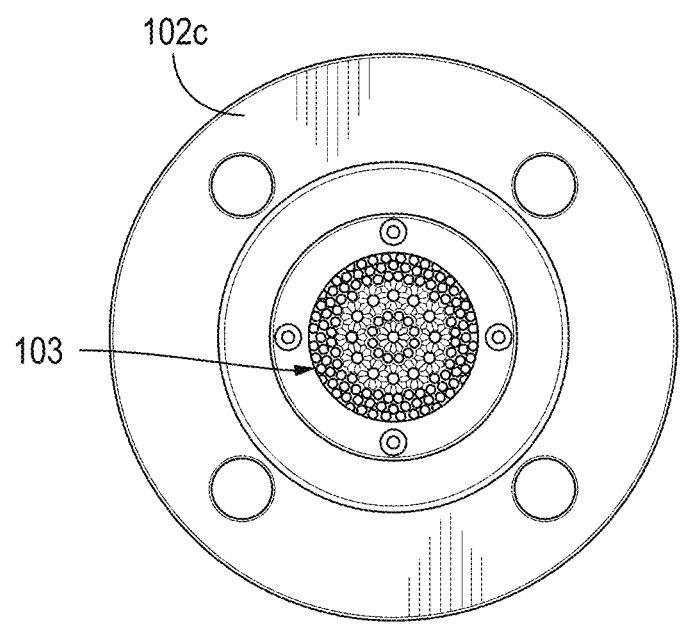
FIG. 4 illustrates a front view of the flow conditioner depicted in FIG. 1 and FIG. 2, in accordance with an embodiment.

FIG. 1 illustrates a side perspective view of a flow conditioner 100, which can be implemented in accordance with an embodiment. FIG. 2 illustrates side view of the flow conditioner 100 depicted in FIG. 1. FIG. 3 illustrates a front view of the flow conditioner 100 depicted in FIG. 1 and FIG. 2. FIG. 4 illustrates a front view of the flow conditioner 100 depicted in FIG. 1 and FIG. 2.

Note that in FIGS. 1 to 4, identical reference numerals refer generally to identical or similar parts or elements. It should be appreciated that in some embodiments, the flow conditioner 100 described and illustrated herein can be adapted for use with a flowmeter. For example, the flow conditioner 100 may be used in front of a flowmeter and in some embodiments, as an internal flow conditioner. A flowmeter may include the flow conditioner 100.

As shown in FIG. 1 and FIG. 2, the flow conditioner 100 can include three parts. The first part 101 is an integrated sub-assembly of two shapers 101*a*, 101*c* with a reducer 101*b* located therebetween. Each shaper can be configured in the form of, for example, a honeycomb plate, a ring plate, a grid plate, a capillary tube, etc. The cross section of the shapers is circular or polygonal, but the cross-section shape and size of multiple core channels can be essentially the same.

A reducer 101*b* may be located in the middle. The structure of reducer 101*b* can be that of a reduced diameter pipe, and its inner diameter gradually decreases along the flow direction. The reducer 101*b* can allow the fluid to produce a retraction effect to further mix the fluid and facilitate asymmetric high-speed flow and low-speed flow in the fluid mix evenly.

A process connection of part 102*a* and part 102*c* together with a holding pipe 102*b* can form a second part 102 of the flow conditioner 100. The second part 102 can function as a holding part to fix the first part 101 and third part 103. The first part 101 and third part 103 can be threaded or welded to this part 102. Furthermore, the second part 102 can provide a connection to a flowmeter and a customer pipeline by a flange bolt connection or a welding. In the pipe between the first part 101 and a third part 103, a mixing space 109 can be located for flow development and to allow the flow to become more symmetrical.

The third part 103 of the flow conditioner 100 can possess the same structure as the first part 101. The third part 103 of the flow conditioner 100 can be located downstream from the holding part 102, and can include a reducer 103b, which can be similar in structure and functioning to the reducer 101b.

The first part 101 of the flow conditioner 100 can reshape the severe disturbance flow fluid first to render it with a uniform and symmetrical flow for ultrasonic measurement. In order to produce a profile more adequately, a mixing space 109 be added following the first part 101 to provide a flow developing space. The third part 103 discussed above can straighten the reshaped severe disturbance flow fluid again to produce the fluid angle and symmetrically rectify the reshaped flow profile, such that the ultrasonic measurement area may be closer to the ideal flow field, thereby greatly reducing measurement errors.

The flow conditioner 100 can be implemented in a configuration that includes a first flow conditioning unit 105 and a second flow conditioning unit 107 with the mixing space 109 located between the first and second flow conditioning units. The first flow conditioning unit 105 and the second flow conditioning unit 107 are indicated in FIG. 2 by respective dashed circular lines, which denote the general regions of the of the flow condition 100 that make up the respective flow conditioning units.

At least one of the first flow conditioning unit 105 or the second flow conditioning unit 107 can include a shaper and/or a reducer. The other of the first flow conditioning unit 105 or the second flow conditioning unit 107 can include one or more shapers. Both flow conditioning units 105 and 107 can include one or more reducers.

In some embodiments, the first flow conditioning unit 105 can include two shapers with a reducer located therebetween. The holding part 102 can hold the first and second conditioning units 105 and 107 and can provide the mixing space 109 for developing the flow. The second flow conditioning unit 107 can also include two shapers with a reducer located between the two shapers (e.g., a reducer located between a first shaper and a second shaper associated with the second flow conditioning unit 107).

In an embodiment, the holding part 102 can include a process connection to a customer pipeline. The holding part 102 can also include the holding pipe 102b, for example, with the mixing space 109 for the flow, and can additionally include a second process connection to the flowmeter. As discussed previously, the shapers can be configured in a form of at least one of: a honeycomb plate, a ring plate, a grid plate, and a capillary tube. The shapers discussed herein can also each possess a cross section that is circular or polygonal. Furthermore, the reducers discussed herein can include a reducer structure of a reduced diameter pipe with an inner diameter that decreases along a direction of the flow.

The embodiments can provide a new working solution for severe disturbance flow measurement by ultrasonic measurement. This approach does not need a long upstream pipeline for severe disturbance flow, which saves installation space, and allow for replacement of existing mechanical meters such as turbine meters. The pressure drop evidenced by the disclosed flow conditioner shows a much lower drop as compared to conventional designs.

Figure 5:
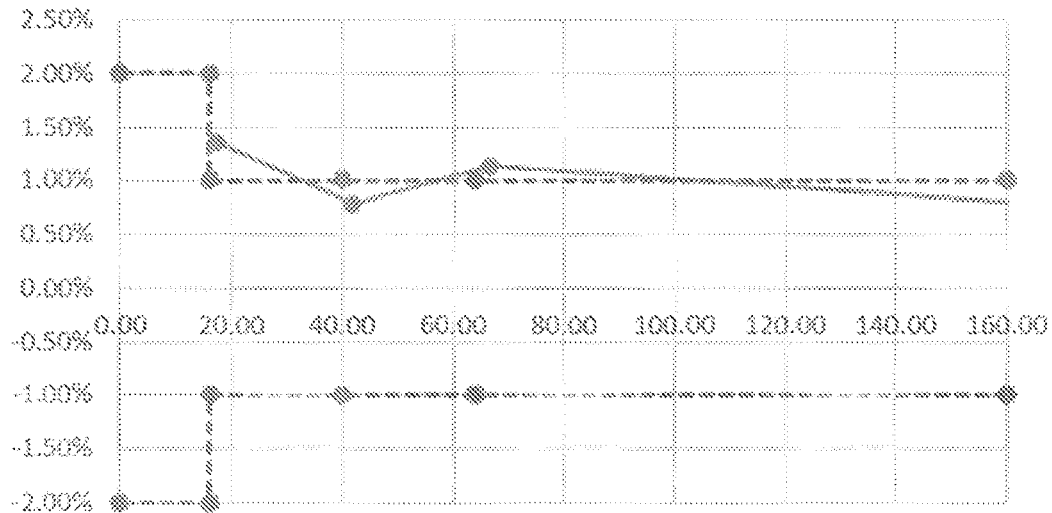
FIG. 5 illustrates a graph depicting data indicative of a 1D 1-double hive structure performance of a halfmoon perturbation test for a flow conditioner, in accordance with an embodiment.
Figure 6:
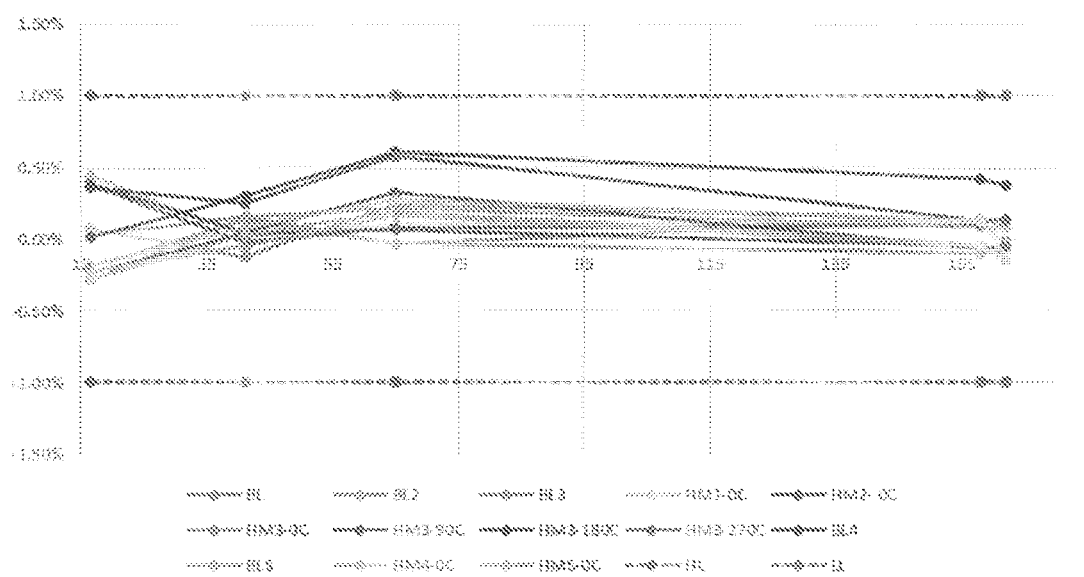
FIG. 6 illustrates a graph depicting data indicative of a 3D 2-double hive structure performance for a flow conditioner, in accordance with an embodiment.

The requirement of severe disturbance flow measurement performance with short length of the upstream pipeline is becoming a "must have" option for current users. A lower pressure drop is therefore a competitive advantage of the flow conditioner 100. That is, FIG. 5 illustrates a graph 120 depicting data indicative of 1D 1-double hive structure performance. FIG. 6 illustrates a graph 130 depicting data indicative of 3D 2-double hive structure performance. These figures demonstrate that in the flow rate working area, the accuracy of halfmoon perturbation test configurations show significant performance improvement. The accuracy improved, for example, from −1%~1.4% to within ±1%.

The flow conditioner 100 can be manufactured by sheet metal stamping, laser welding, vacuum brazing, investment molding, machining or any other manufacturing process that can form the shape of the design. The flow conditioner 100 can be used in gas and liquid pipelines before some instruments or equipment that require a uniform and symmetrical flow profile for severe disturbance flow, and other occasions when needed. The flow conditioner 100 can be used in front of a flowmeter and can be used as an internal flow conditioner.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A flow conditioner, comprising:
   a first flow conditioning unit, wherein the first flow conditioning unit comprises a first shaper, a second shaper, and a reducer located between the first shaper and the second shaper;
   a mixing space for developing a flow, wherein the mixing space is defined downstream of the first flow conditioning unit along a flow direction; and
   a second flow conditioning unit, wherein the second flow conditioning unit comprises a first shaper, a second shaper, and a reducer located between the first shaper and the second shaper, the second flow conditioning unit positioned downstream of the mixing space along the flow direction.

2. The flow conditioner of claim 1 further comprising a holding part that holds the first and second flow conditioning units and provides the mixing space for developing the flow.

3. The flow conditioner of claim 2 wherein the holding part comprises a process connection to a pipeline.

4. The flow conditioner of claim 3 wherein the holding part further comprises a holding pipe and a second process connection to a flowmeter, wherein the mixing space is provided in the holding pipe.

5. The flow conditioner of claim 1 wherein the first shaper and the second shaper of the first flow conditioning unit and the first shaper and the second shaper of the second flow conditioning unit are each configured in a form of at least one of: a honeycomb plate, a ring plate, a grid plate, and a capillary tube.

6. The flow conditioner of claim 1 wherein the first shaper and the second shaper of the first flow conditioning unit and the first shaper and the second shaper of the second flow conditioning unit each have a circular cross section or polygonal cross section.

7. The flow conditioner of claim 1 wherein each reducer comprises a reducer structure comprising a reduced diameter pipe with an inner diameter that decreases along the flow direction.

8. A flowmeter, comprising:
a flow conditioner comprising a first flow conditioning unit and a second flow conditioning unit and a mixing space for developing a flow,
wherein the first flow conditioning unit comprises a first shaper, a second shaper, and a reducer located between the first shaper and the second shaper, wherein the first flow conditioning unit is positioned upstream of the mixing space along a flow direction,
wherein the second flow conditioning unit comprises a first shaper, a second shaper, and a reducer located between the first shaper and the second shaper, wherein the second flow conditioning unit is positioned downstream of the mixing space along the flow direction.

9. The flowmeter of claim 8 wherein the flow conditioner comprises a holding part that holds the plurality of first and second flow conditioning units and provides the mixing space for developing the flow.

10. The flowmeter of claim 9 wherein the holding part comprises a process connection to a pipeline.

11. The flowmeter of claim 10 wherein the holding part further comprises a holding pipe, wherein the mixing space is provided in the holding pipe.

12. The flowmeter of claim 8 wherein the shapers are each configured in a form of at least one of: a honeycomb plate, a ring plate, a grid plate, and a capillary tube.

13. The flowmeter of claim 8 wherein the shapers each possess a cross section that is circular or polygonal.

14. The flowmeter of claim 8 wherein each reducer comprises a reduced diameter pipe, wherein an inner diameter of the reduced diameter pipe decreases along the flow direction.

* * * * *